July 15, 1930.  E. F. RUSS  1,770,662

INDUCTION FURNACE

Filed May 24, 1928

Patented July 15, 1930

1,770,662

UNITED STATES PATENT OFFICE

EMIL FRIEDRICH RUSS, OF COLOGNE, GERMANY

INDUCTION FURNACE

Application filed May 24, 1928, Serial No. 280,342, and in Germany August 21, 1926.

In induction furnaces with closed melting channels a vigorous flow of the stream of molten metal is of greatest importance, not only to obtain thorough mixing thereof, but also to prevent local overheating in the narrow melting channel which has a small capacity compared with the contents of the furnace. In most induction furnaces an automatic movement of the molten material is set up, which, according to the construction of the furnace, is due sometimes to thermodynamic, sometimes to electrodynamic and sometimes to hydrodynamic influences.

Hitherto these influences have been utilized, partly intentionally and partly unintenionally, thereby allowing undesired disturbing influences to occur, which counteract the useful influences for assisting the circulation. These act particularly in melting such metals as copper, bronze, and the like, which are very sluggish in the liquid condition.

Thus, for example, in a furnace with vertical melting channels the thermal action in the two limbs of the channel is such that in the lower part of the channel the danger of overheating exists.

In furnaces with laterally disposed melting channels which open at different heights into the melting chamber, the thermal driving action is uniform throughout the whole run of the channel. But on the other hand, hitherto in these furnaces the repulsion of the primary winding in the lower part of the channel has acted against the circulation.

The invention overcomes this disadvantage in that the whole run of the channel is arranged above the centre of the primary winding.

Figure 1:
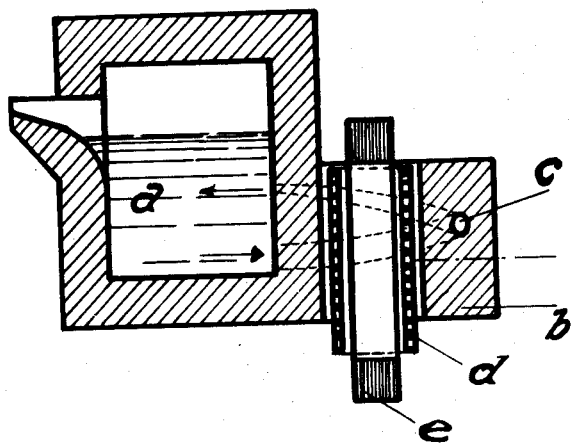
Figure 2:
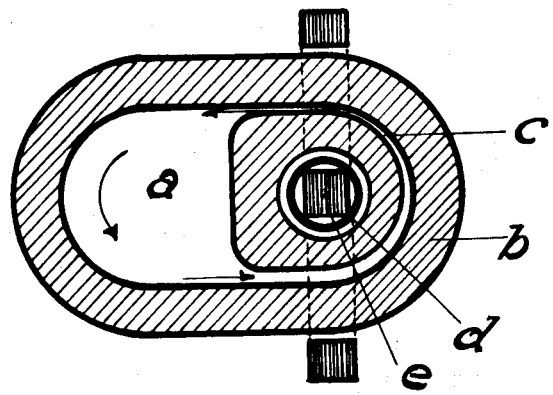
Figure 3:
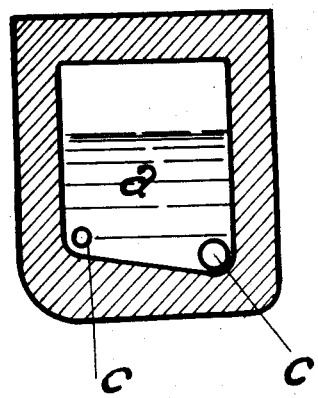

In Figs. 1, 2 and 3 of the accompanying drawing a constructional embodiment of the invention is illustrated by way of example. The hearth chamber $a$ of suitable form has on one side, and advantageously at the lower part, an addition $b$. In this the melting channel $c$ is arranged so that it surrounds the primary winding $d$ with its iron core $e$ like a rising incline and opens into the melting chamber $a$ with its two ends at different heights.

According to the invention the whole run of this melting channel is arranged above the centre of the primary winding $d$. Consequently the repulsion of the primary coil acts in the whole channel from its lower inlet opening to its upper outlet opening as an upwardly driving force. The thermodynamic action acts in the same way over the whole channel.

The whole of the said influences causing circulation thus act in the same direction over the whole run of the channel so that even with heavy metals a vigorous and uninterrupted circulation in the same direction is brought about.

According to the invention the action of the forces, causing movement may be further improved by the special formation of the channel and the hearth chamber.

For this purpose, for example, the upper part of the channel can be widened so that the molten material rising by the thermal action from the narrower, lower parts can flow out through the upper part into the hearth chamber with less frictional resistance.

A further feature consists in that the channel may be narrowed towards the upper end. This gives a greater velocity of flow in the upper part than in the lower part; the upper part spurts the molten material like a nozzle into the hearth chamber, while the lower part sucks further material from the hearth chamber.

In order to maintain the frictional resistance and the cooling surface of the channel as small as possible it may be formed of circular or oval cross-section.

The flow in the channel can finally be assisted by the special form of the hearth chamber, in that the floor of the chamber slopes from the upper to the lower openings of the channel, for example as shown in Fig. 3. The material flowing out of the upper opening is thereby given a natural fall towards its return path to the lower opening. Moreover this form of the floor of the hearth chamber has the advantage that the sump necessary for holding the heat is smaller.

I claim:

1. An induction furnace having a hearth or melting chamber and an addition to one side thereof, a primary winding extending vertically through said addition and a melting channel extending from the melting chamber around the primary winding and returning to the melting chamber, said melting channel being inclined so that its ends which communicate with the melting chamber are at different heights and said channel being entirely located above the middle of the primary coil and being tapered from its inlet end to its discharge end.

2. An induction furnace as claimed in claim 1, in which the bottom or hearth of the melting chamber is inclined and descends from the upper, smaller end of the channel to the lower, larger end thereof.

In testimony whereof I have hereunto set my hand this 23rd day of March, A. D. 1928.

EMIL FRIEDRICH RUSS.